United States Patent [19]

Barnett et al.

[11] 4,270,470
[45] Jun. 2, 1981

[54] COMBUSTION SYSTEM AND METHOD FOR BURNING FUEL WITH A VARIABLE HEATING VALUE

[76] Inventors: William O. Barnett, 38 Valentine La., Levittown, Pa. 19054; William K. Barnett, 38 Deanna Dr. #112, South Somerville, N.J. 08876

[21] Appl. No.: 33,573

[22] Filed: Apr. 27, 1979

[51] Int. Cl.³ .............................................. F23G 5/00
[52] U.S. Cl. .................................. 110/346; 110/222; 110/345; 236/15 E; 122/2
[58] Field of Search ............... 110/188, 190, 210, 220, 110/222, 223, 234, 243, 244, 104 B, 346-348, 345; 432/72; 236/15 E; 122/2

[56] References Cited

U.S. PATENT DOCUMENTS

| | | | |
|---|---|---|---|
| 3,132,802 | 5/1964 | Dykeman et al. | 236/15 E |
| 3,243,116 | 3/1966 | Dijt et al. | 236/15 E |
| 3,288,199 | 11/1966 | Gerrard et al. | 236/15 E |
| 3,387,574 | 6/1968 | Mullen | 110/244 |
| 3,404,836 | 10/1968 | Hickam | 236/15 E |
| 3,511,194 | 5/1970 | Stookey | 110/346 |
| 3,519,254 | 7/1970 | Putman | 236/15 E |
| 3,584,587 | 6/1971 | Siracusa | 110/346 |
| 4,041,906 | 8/1977 | Edwards | 110/222 |
| 4,182,246 | 1/1980 | Lombana et al. | 110/188 |
| 4,193,354 | 3/1980 | Woods | 110/212 |

*Primary Examiner*—Henry C. Yuen

*Attorney, Agent, or Firm*—Ferrill and Logan

[57] ABSTRACT

The preferred embodiment of the invention disclosed herein includes apparatus for and steps of separating glass, metal and other generally non-combustible material from refuse to provide a volume of generally combustible refuse, shredding this volume of combustible refuse into relatively small particles, mixing these particles with primary combustion air and conveying the resultant mixture of air and particles into a combustion chamber. The combustion chamber is preheated by auxiliary heating means to a temperature sufficient to cause the mixture to be self-igniting in the combustion chamber. Secondary combustion air is fed to the combustion chamber at spaced-apart points within the chamber for assuring a complete combustion process. This chamber is maintained under a negative pressure by a fan downstream and the combustion gases are thus caused to flow from the combustion chamber to an associated device utilizing the heat energy, for example, a steam boiler, and from the steam boiler, the gases are exhausted through a stack to the atmosphere. Oxygen measuring means is located on the discharge side of the boiler for measuring the amount of excess oxygen discharged to the atmosphere. In response to this measurement, the feed rate of the shredded particles of refuse is adjusted to maintain a substantially constant amount of excess oxygen in the combustion gases whereby the B.T.U. output is controlled.

13 Claims, 4 Drawing Figures

COMBUSTION SYSTEM AND METHOD FOR BURNING FUEL WITH A VARIABLE HEATING VALUE

This invention relates to a method and system for converting refuse to useful heat energy and, more particularly, to a method and system for burning refuse in a self-combusting process in such a way that the B.T.U. output of the combustion gases is controlled and can be utilized as a source of heat energy.

Amount the problems becoming increasingly acute to society is the problem of disposing of refuse in a safe and relatively clean manner; another problem relates to the provision of heat energy in a relatively economical manner. As a solution to both of these problems, it has been proposed to dispose of the refuse by burning it and using the resulting combustion gases as a source of heat energy in a steam boiler or other apparatus utilizing heat energy. Various techniques have been tried to accomplish this result. A major problem in carrying out such techniques is that the refuse, being comprised of many different materials, has a variable heating value. Thus, control of the combustion process to provide a desired B.T.U. output which can be utilized with associated equipment requiring heat energy, is extremely difficult.

Accordingly, it is an object of this invention to provide a system for and a method of disposing of refuse and providing useful heat energy in an efficient and economical manner.

It is another object of this invention to provide a method of and system for controlling the combustion of refuse or other fuel having a variable heating value in a combustion chamber whereby there is a controllable B.T.U. output.

Finally, it is an object of this invention to provide a system for and a method of burning fuel having a variable heating value in a combustion chamber in which the feed rate of the fuel to the combustion chamber is controlled in accordance with the oxygen content of the combustion gases to provide a desired B.T.U. output.

These and other objects of this invention are accomplished by separating glass, metals and other non-combustibles from the refuse leaving a volume of generally combustible refuse, shredding the combustible refuse into relatively small particles, mixing the particles with primary combustion air and injecting the mixture into a heated combustion chamber. After the mixture enters the combustion chamber, it ignites and is converted to combustion gases which flow through the chamber under the influence of a balanced draft maintaining a negative pressure in the combustion chamber so that the combustion gases exhaust to an apparatus utilizing the heat energy in the combustion gases to perform useful work. The combustion gases, after they leave the apparatus utilizing their heat energy, are analyzed to determine the oxygen content thereof and the feed rate of the particles of refuse to the combustion chamber is adjusted and controlled in response to this measurement. More particularly, the combustion gases are analyzed and the flow rate of the particles of refuse is adjusted so that the oxygen content of the combustion gases is maintained substantially constant.

In the preferred embodiment of the invention disclosed herein, secondary combustion air is injected into the combustion chamber to provide the additional oxygen required for combustion. For a given load demand by the apparatus utilizing the heat energy, the amount of secondary air and the amount of primary air are maintained constant. If the demand by the apparatus utilizing the heat energy changes, the amount of secondary air fed to the combustion chamber is adjusted in response to the change in demand. The change in secondary air, of course, provides for a variation in the oxygen present in the combustion gases which, in turn, causes a corresponding change in the feed rate of the particles of refuse to the combustion chamber.

For a better understanding of the invention, reference is made to the following description of a preferred embodiment thereof, taken in conjunction with the figures of the accompanying drawing, in which.

Figure 1:
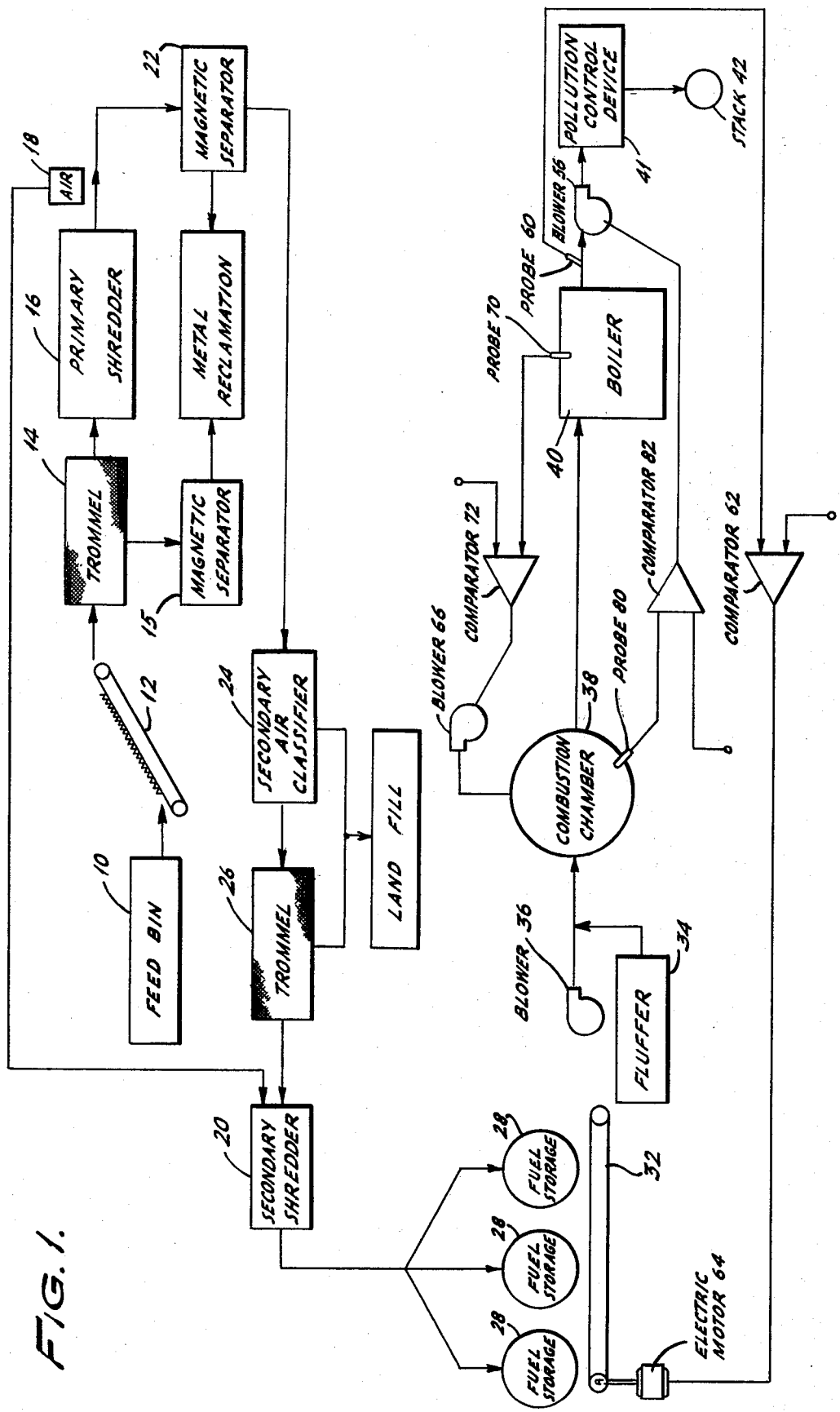
FIG. 1 is a schematic illustration of a system in accordance with this invention for performing a method in accordance with this invention.

Referring to the drawing, there is disclosed an arrangement of apparatus comprising a system in accordance with this invention operative to dispose of refuse. It should be understood, however, that this invention is operative with any fuel having a variable heating value. Solid wastes, including combustible municipal, commercial, industrial and agricultural wastes, and biomass are collected and transported, for example by trucks, to a feed bin 10 or storage area where the refuse is deposited. From the feed bin 10, the refuse may be transported by appropriate conveyors to a carton breaker 12 or similar apparatus which breaks or tears open the cartons, bags or other closures in which the refuse is contained. The refuse is then fed to a trommel 14, that is, a rotating drum, the cylindrical sides of which are formed of a screen material so that relatively small particles fall through the screen to another conveyor which carries these undersized materials to a magnetic separator 15 in which ferrous metals are separated out for reclamation. The refuse in the trommel 14 which is too large to fall through the screen openings, is fed to a primary shredder 16 which can be of any generally conventional type and which is operative to shred the refuse into smaller size particles. When this shredded refuse is discharged from the primary shredder 16 it passes under a primary air classifier 18, that is, an air conveying device providing enough suction to pull off the light particles of refuse, usually paper, and similar refuse particles, and feed it downstream to a secondary shredder 20. The particles which are too heavy to be conveyed by the primary air classifier 18 are fed to another magnetic separator 22 in which the magnetic refuse is separated for metal reclamation. The remaining refuse other than the magnetic material is conveyed from the separator 22 to a secondary air classifier 24 which is operative to remove almost all of the generally light-weight combustible material and feed it into another trommel 26. The heavy portion of refuse, which primarily comprises glass, non-ferrous metals such as brass, and other material is discharged into a reclamation area and can be used in a land fill. The trommel 26 has a cylindrical sidewall made of screening material having relatively small openings, for example, on the order of about one-half of an inch, so that the small heavier refuse particles are separated out for reclamation or use as a land fill. The larger size and lighter refuse particles are fed from this trommel 26 to the secondary shredder 20 which shreds these particles along with the particles from the primary shredder 16 via the air separator 18 into even smaller sized particles from which it is fed to one or more fuel storage tanks 28.

The just-described system is comprised of generally conventional apparatus which should be familiar to one skilled in the art. While the arrangement described for shredding and separating the refuse so that particles of generally combustible refuse are fed to the storage tank 28 is preferred, it should be specifically understood that various other systems and arrangements can be utilized. It should also be understood that this just-described system may not be needed when this invention is practiced with fuels other than refuse having a variable heating value.

Still referring to FIG. 1 of the drawing, the remainder of the system in accordance with this invention is illustrated. From the fuel storage tank 28, when it is desired to utilize the particles of refuse in a combustion process, the particles are removed by a feeder arrangement which can include a variety of conventional apparatus. In the system described herein, there is provided suitable scrapers or screw conveyors associated in the fuel storage tank 28 which remove the particles from the storage tank and convey it to a generally conventional belt conveyor 32. This conveyor 32 has roller means at each end over which an endless belt travels and carries the particles of refuse. Since the refuse may have compacted to a significant extent in the storage tank 28, the conveyor 32 transports it upwardly to a fluffer 34. This fluffer 34 can be a generally conventional apparatus which is operative to cause separation and loosening of the refuse. From the fluffer 34, the loosened refuse particles are conveyed by an air conveyor 36 to a combustion chamber 38. The air conveyor 36 provides a constant, but adjustable, volume of air which carries the particles along with the air into the combustion chamber 38 to provide a portion, preferably about thirty percent, of the air supplied to the combustion chamber. As will be explained more clearly hereinafter, the combustion chamber 38 receives additional or secondary air to support combustion. For thermal efficiency the primary and secondary air supplied to the combustion chamber may be heated in an air preheater provided on the associated utilizing device. The refuse is burned in the combustion chamber 38 and converted to hot combustion gases which are fed from the combustion chamber to any apparatus requiring or utilizing heat energy. In the embodiment disclosed herein, the apparatus is a steam boiler 40 and the combustion gases are utilized to generate the steam. From the steam boiler 40, these gases, impelled by a blower 56, pass through a pollution control device 41, such as a bag house, a Venturi Scrubber or an electrostatic precipitor, and are discharged in relatively clean condition to the atmosphere through stack 42.

In accordance with this invention, the feed rate of the feeder 32 is controlled in response to the oxygen content of the combustion gases discharged from the combustion chamber 38. Thus, when variations in the heating value of the fuel fed to the combustion chamber occur the excess oxygen present in the combustion gases will vary so that by maintaining the excess oxygen constant, the B.T.U. output is also constant.

In accordance with another aspect of this invention, the flow of secondary air to the combustion chamber is constant for any load demand by the boiler 40 so that as long as the demand load is constant, the only adjustment made is to the feed rate of the fuel. Should the load demand change, there is means for changing the amount of secondary air fed to the combustion chamber 38. This change, in turn, causes a corresponding change in the oxygen content of the combustion gases which, in turn, causes an adjustment of the fuel feed rate.

Figure 2:
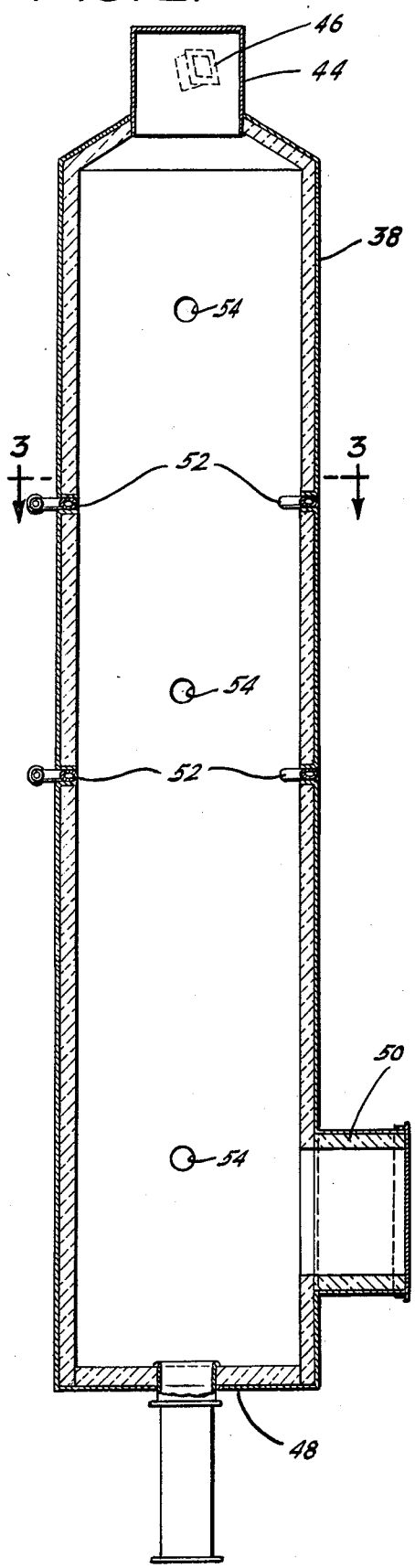
FIG. 2 is a longitudinal sectional view of a preferred embodiment of a combustion chamber useable in the system illustrated in FIG. 1.
Figure 3:
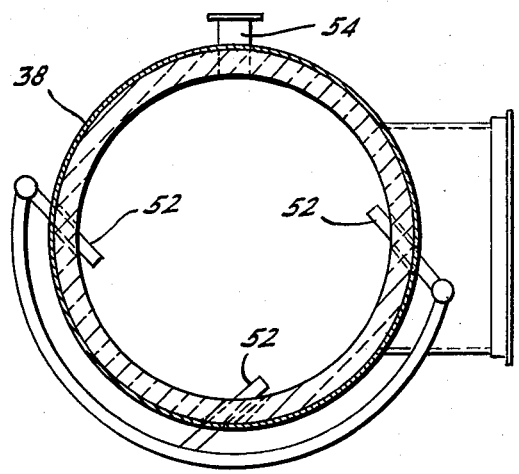
FIG. 3 is a sectional view taken generally along the line 3—3 of FIG. 2.

Referring particularly to FIG. 2 of the drawing, the combustion chamber 38 is illustrated and can be seen to be in the form of a generally cylindrical member oriented with its longitudinal axis in a generally vertical attitude. Other orientations, of course, can be provided, but the vertical orientation is preferred since it provides for a more efficient combustion process and requires less area. The cylindrical member can be formed by an outer metal shell lined along its inner surface with refractory brick or other suitable insulation which functions to minimize heat loss through the metal shell and provides a source of radiant energy to maintain ignition of the fuel particles. The upper or inlet end of the combustion chamber 38 includes a tapered wall portion on which is located a cylindrical housing 44 formed with an air inlet opening 46. The inlet opening 46 is tangentially oriented with respect to the circular portion of the housing 44. The primary combustion air and the particles of shredded refuse are injected through the opening 46 so that a cyclonic motion is imparted to the mixture as it is injected into the combustion chamber. At a lower or discharge end of the combustion chamber 38 there is provided a discharge opening 48 which can be associated with a water lock and a conveyor, as is generally conventional, to provide for the removal of molten slag formed during combustion process or any non-combustible refuse fed to the combustion chamber which will settle and accumulate therein. This material, fractured by sudden chilling, is readily ground to a useful aggregate for concrete, asphalt or road bed or may be used as a sterile land fill. In the lower portion of the cylindrical wall forming the combustion chamber, adjacent the bottom portion thereof, there is a discharge opening 50 through which the combustion gases are discharged to the boiler 40.

It can be seen that at a plurality of axially spaced locations there are provided a plurality of tuyeres 52 which discharge secondary combustion air into the combustion chamber 38 along a tangential path so that there is a cyclonic motion imparted to the air as it enters the chamber. These tuyeres are connected to blower 66 and discharge about seventy percent of the total combustion air into the combustion chamber.

In addition, it can be seen that there are a plurality of auxiliary burners 54 which are utilized to initially preheat the combustion chamber to a temperature whereby the refuse can be ignited when it is discharged into the chamber. Once the fire ball inside the combustion chamber is established, use of the auxiliary burners is discontinued.

Combustion temperatures in the chamber 38 are normally in the range of 2,000° F. to 2,500° F. The induced draft blower 56, downstream from boiler 40, maintains a slight negative pressure in the combustion chamber 38. A pressure probe 80 near the top of chamber 38 is operative to measure the pressure and to provide an electrical signal which is a function thereof. The signal is fed to a comparison circuit 82 where it is compared against a signal representative of the desired pressure. Depending on the difference between actual and desired pressure a signal is discharged from the comparison circuit 82 that adjusts inlet louvers on the intake side of the blower 56 to provide the desired pressure. Temperature of the combustion gases entering pollution control device 41 is about 300° F. depending on the design of the boiler, economizer and air preheater.

Referring back to FIG. 1 of the drawing, there is disclosed an oxygen measuring arrangement and fuel feed control system usable with this invention. There is provided a generally conventional oxygen analyzer 60 located in the stack 42. This analyzer is in the form of a probe and is operative to measure the amount of oxygen in the combustion gases to provide an electrical signal which is a function thereof. One suitable such device is the Model 218 probe manufactured by the Computer and Instrumentation Division of Westinghouse Electric Corporation. The signal from probe 60 is fed to a comparison circuit 62 where it is compared against a signal representative of a predetermined amount of excess oxygen in the combustion gas, for example, 3% to 4%. Depending on the difference between the actual and desired oxygen in the combustion gas, a signal is discharged from the comparison circuit 62 that adjusts the speed of motor 64 driving the belt associated with the feeder 32. If the amount of oxygen in the combustion gases is lower than the predetermined amount, the speed of the feeder is decreased so that less refuse is fed to the combustion chamber 38. Conversely, if the amount of oxygen is excessive, the signal is operative to speed up the motor and increase the amount of refuse fed to the combustion chamber 38.

Still referring to FIG. 1 of the drawing, there is disclosed a control system also operative with this invention for controlling the amount of secondary air fed to the combustion chamber 38. A steam pressure sensor and transmitter 70 is located in the steam header associated with the boiler 40 and operative to determine the pressure of the steam in there and to provide a signal which is a function thereof. This signal from sensor 70 is compared in a comparison circuit 72 against a signal representative of the load demand of the boiler. Thus, when the load demand changes, the comparison circuit 72 outputs a signal that controls a damper in the tuyeres feed system or the blower motor feeding the tuyeres. This in turn changes the amount of secondary air fed to chamber 38 which changes the amount of excess oxygen in the combustion gases. When the excess oxygen changes, the probe 60 senses it and changes the feed rate of the fuel to the chamber 38 as previously explained.

Figure 4:
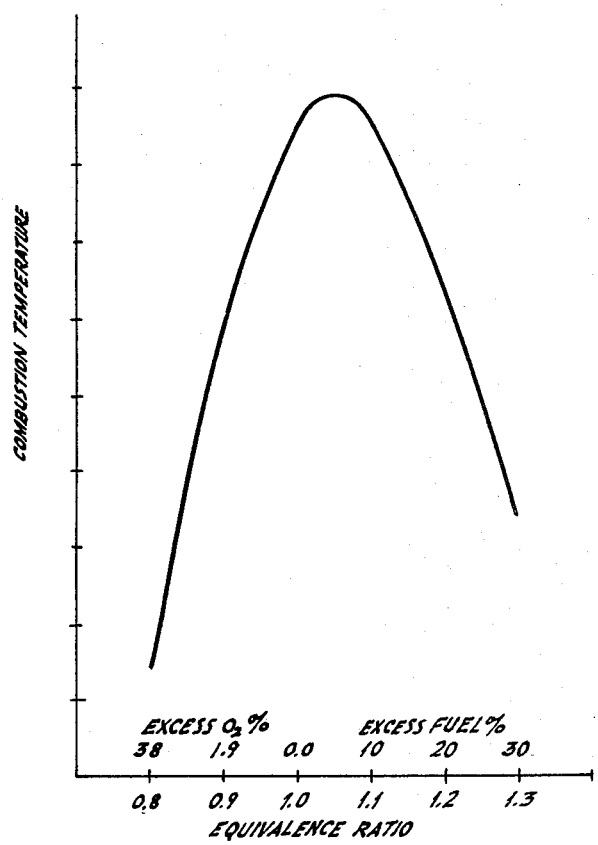
FIG. 4 is a graph illustrating the relationship between the fuel air ratio in the combustion chamber and the combustion temperatures therein.

Referring to FIG. 4 of the drawing, there is illustrated a graph showing the ratio of fuel to air on the X-axis and the estimated refuse combustion temperature on the Y-axis. The curve is generally parabolic so that at any temperature there are two fuel to air ratios. Thus, measuring temperature of the combustion gases to determine adjustments to combustion condition gives rise to a trial and error procedure to determine on which leg of the curve the system is operating. By measuring the oxygen in the combustion gases in accordance with this invention, no such trial and error is needed and the response is relatively rapid.

A system and method in accordance with this invention has been successfully operated with refuse having a moisture content ranging from 20% to 40%; the usual vibration has been observed to range between 30% to 38%. In addition to burning refuse, it has been determined that sewage sludge cake having a moisture content ranging up to 60% can be mixed with the refuse for feeding to the combustion chamber 38.

From the preceding description of a preferred embodiment of the invention, it should be obvious that various changes can be made within the scope of the invention as recited in the appended claims.

We claim:

1. A method of providing useful heat energy from a fuel having variable heating value to meet a varying load demand of a heat using means comprising the following steps:
   feeding said fuel having variable heating value into a preheated combustion chamber;
   forcing combustion air at a controlled rate into said combustion chamber whereby the fuel burns and is converted into hot combustion gases;
   discharging the combustion gases to the heat using means;
   measuring the load demand of the heat using means;
   varying the feed of combustion air in accordance with changes in the load demand of the heat using means;
   measuring the oxygen content of the combustion gases;
   and adjusting the feed rate of the fuel to the combustion chamber in accordance with change of the oxygen content of the combustion gases to maintain the oxygen content of the combustion gases substantially constant.

2. A method in accordance with claim 1 wherein the fuel feed rate is decreased if the oxygen content of the combustion gases decreases and is increased if the oxygen content of the combustion gases increases.

3. A method in accordance with claim 1 further including the step of maintaining a negative pressure across the combustion chamber to provide for the controlled discharge of the combustion gases into the heat using means.

4. A method in accordance with claim 1 wherein the fuel includes refuse and wherein the refuse is sorted and shredded prior to feeding it to the combustion chamber.

5. A method in accordance with claim 4 including the step of feeding the shredded refuse into the combustion chamber with a generally constant volume of air which is part of the air required for combustion.

6. A method in accordance with claim 5 wherein a secondary volume of air is fed to the combustion chamber and is maintained generally constant for any particular load demand of the heat using means.

7. A method in accordance with claim 6 including the steps of measuring the load demand of the heat using means and adjusting the flow of secondary air into the combustion chamber in response thereto.

8. A system for providing useful heat energy from a fuel having variable heating value to meet a varying load demand of a heat using means, said system comprising: storage means for storing a volume of fuel having a variable heating value, a combustion chamber in which said fuel can be burned and converted into combustion gases, feeder means for feeding the fuel to the combustion chamber, blower means for forcing primary and secondary combustion air into said combustion chamber, heat using means of variable load demand receiving the hot combustion gases, first control means controlling the amount of secondary air forced into said combustion chamber in response to the load demand of said heat using means, means for measuring the oxygen content of the combustion gases, and second control means for adjusting the feed rate of the fuel feeder means in response to a change in the oxygen content of the combustion gases to maintain the oxygen content of the combustion gases substantially constant.

9. A system in accordance with claim 8 wherein said oxygen measuring means is operative to decrease the speed of said feeder means in response to a decrease in the oxygen content of the combustion gases and to increase the speed of said feeder means in response to an increase in the oxygen content of the combustion gases.

10. A system in accordance with claim 8 including additional blower means for maintaining a negative pressure across the combustion chamber to provide for the controlled discharge of the combustion gases into the heat using means.

11. A system in accordance with claim 8 wherein the fuel is refuse and wherein the system includes means for sorting and shredding the refuse prior to feeding it to the combustion chamber.

12. A system in accordance with claim 11 wherein said feeder means includes air conveyor means providing a generally constant volume of air whereby a mixture of refuse and air are fed said combustion chamber, said air providing a part of the air required for combustion.

13. A system in accordance with claim 12 including means for measuring the load demand of the heat using means and for adjusting the flow of the additional air into the combustion chamber in response thereto.

* * * * *

UNITED STATES PATENT AND TRADEMARK OFFICE
CERTIFICATE OF CORRECTION

PATENT NO. : 4,270,470
DATED : June 2, 1981
INVENTOR(S) : William O. Barnett and William K. Barnett It is certified that error appears in the above—identified patent and that said Letters Patent is hereby corrected as shown below:

Col. 6, line 1 - "vibration" should be --variation--

Signed and Sealed this

First Day of September 1981

[SEAL]

Attest:

Attesting Officer

GERALD J. MOSSINGHOFF

Commissioner of Patents and Trademarks